(12) United States Patent
Hattori et al.

(10) Patent No.: US 10,821,641 B2
(45) Date of Patent: Nov. 3, 2020

(54) SPACER FOR FOREIGN OBJECT DETECTION SENSOR AND TERMINAL PORTION MOLDING METHOD OF FOREIGN OBJECT DETECTION SENSOR

(71) Applicant: AISIN SEIKI KABUSHIKI KAISHA, Kariya-shi (JP)

(72) Inventors: Wataru Hattori, Okazaki (JP); Yuki Osaki, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 35 days.

(21) Appl. No.: 16/245,560

(22) Filed: Jan. 11, 2019

(65) Prior Publication Data

US 2019/0210259 A1    Jul. 11, 2019

(30) Foreign Application Priority Data

Jan. 11, 2018 (JP) .................................. 2018-002690

(51) Int. Cl.
| | |
|---|---|
| H01H 3/00 | (2006.01) |
| B29C 45/17 | (2006.01) |
| B60J 10/273 | (2016.01) |
| H01H 3/14 | (2006.01) |
| B60R 11/00 | (2006.01) |

(52) U.S. Cl.
CPC ...... *B29C 45/1742* (2013.01); *B29C 45/1775* (2013.01); *B60J 10/273* (2016.02); *H01H 3/142* (2013.01); *B29C 2045/1786* (2013.01); *B29C 2045/1791* (2013.01); *B60R 2011/0043* (2013.01); *E05Y 2900/532* (2013.01)

(58) Field of Classification Search
CPC .... B60J 10/273; H01H 3/142; B29C 45/1742; B29C 2045/1786; B29C 2045/1791
USPC ....................................................... 73/866.5
See application file for complete search history.

(56) References Cited

U.S. PATENT DOCUMENTS 8,441,366 B2 *  5/2013  Buss ........................ B60J 5/101
340/686.1

FOREIGN PATENT DOCUMENTS

| JP | 2015-20549 |   | 2/2015 |
|---|---|---|---|
| JP | 2015020549 A | * | 2/2015 |
| JP | 2016-97811 |   | 5/2016 |

* cited by examiner

*Primary Examiner* — Jamel E Williams
(74) *Attorney, Agent, or Firm* — Oblon, McClelland, Maier & Neustadt, L.L.P.

(57) ABSTRACT

A spacer for a foreign object detection sensor including an elongated hollow sheath, two conductive members, and two core wires buried in the two conductive members, the spacer being used for a terminal portion of the foreign object detection sensor and including a first member including an insertion portion configured to be inserted into a space between the two conductive members, and a concave-shaped second member including a first end portion and a second end portion, the first end portion at which a locking portion is provided to be locked to a first end of the first member, the second end portion which is opposed to the locking portion and is connected to a second end of the first member via an integral hinge, the second member containing one of the two conductor portions inside a closed cross-section formed between the first member and the second member.

8 Claims, 11 Drawing Sheets

FIG. 10
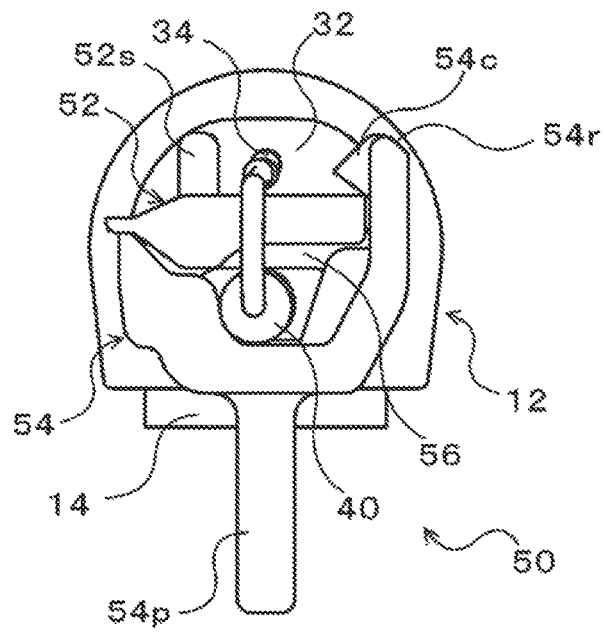
FIG. 11   MOLDING MATERIAL
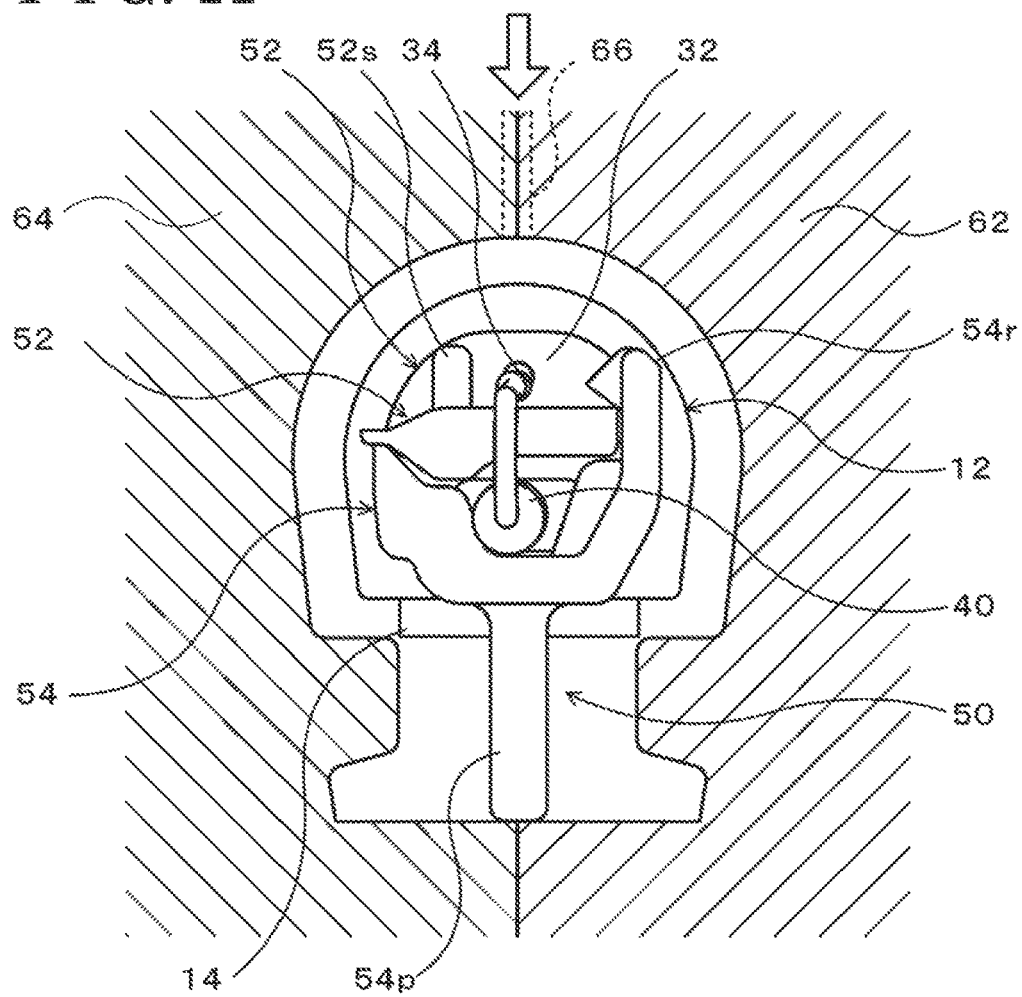

SPACER FOR FOREIGN OBJECT DETECTION SENSOR AND TERMINAL PORTION MOLDING METHOD OF FOREIGN OBJECT DETECTION SENSOR

CROSS REFERENCE TO RELATED APPLICATIONS

This application is based on and claims priority under 35 U.S.C. § 119 to Japanese Patent Application 2018-002690, filed on Jan. 11, 2018, the entire content of which is incorporated herein by reference.

TECHNICAL FIELD

This disclosure generally relates to a spacer for a foreign object detection sensor and a terminal portion molding method of the foreign object detection sensor.

BACKGROUND DISCUSSION

Conventionally, a foreign object detection sensor that is mounted on a door and detects existence of a foreign object by two conductive portions disposed in a hollow portion with a space portion interposed therebetween being brought into contact with each other, has been known. For example, JP2016-97811A (Reference 1) discloses a terminal portion molding method of a foreign object detection sensor in which, at a terminal portion of a sensor, two lead wires connected to a control device or a resistor are connected to two core wires drawn out of a hollow portion and the terminal portion is die-molded while a space portion is filled with an insert (spacer). The insert (spacer) is made of a material having flexibility and non-conductivity and includes an insertion portion press-fitted into the space portion and a projecting portion for positioning the two core wires drawn out of the hollow portion in the longitudinal direction. The projecting portion has a cross-section formed into a substantially H-shape and performs positioning in such a way as to contain two wire connection portions between the core wires and the lead wires inside the H-shape. When the terminal portion of the sensor is die-molded, after performing an insert mounting process in which the insertion portion of the insert is press-fitted into the space portion, by setting the terminal portion of the sensor into which the insert is press-fitted to a die and injecting a die-molding material, that is, by injection molding, the wire connection portions between the core wires and the lead wires, which are exposed from the terminal portion, and the projecting portion of the insert are covered from the outside.

However, in the terminal portion molding method of the foreign object detection sensor described above, it is difficult to insert the spacer after the lead wires are respectively connected to the two core wires drawn out of the hollow portion because the cross-section of the projecting portion of the spacer is formed into an H shape, as a result of which workability deteriorates. In addition, depending on an injection position at the time of injection molding, there is a concern that the spacer is displaced due to injection pressure and the core wires are exposed to the outside of the mold.

A need thus exists for a spacer for a foreign object detection sensor and a terminal portion molding method of the foreign object detection sensor that are not susceptible to the drawback mentioned above.

SUMMARY

A spacer for a foreign object detection sensor that includes an elongated hollow sheath having insulating property and elasticity, two conductive members having conductivity and elasticity and extending along a longitudinal direction of the sheath while being separated from each other inside the sheath, and two core wires respectively buried in the two conductive members and that detects existence of a foreign object by the two core wires which are electrically connected to each other in association with elastic deformation of the sheath due to pressing force from the foreign object, the spacer that is used for a terminal portion of the foreign object detection sensor being molded by, while two exposed conductor portions of lead wires are respectively connected to the two core wires drawn out of an end portion of the sheath, setting a molding die in such a way as to cover the end portion of the sheath and the two conductor portions, and injecting and solidifying a melted molding material into the molding die, and electrically insulating the two conductor portions from each other, the spacer including a first member including an insertion portion configured to be inserted into a space between the two conductive members at the end portion of the sheath, and a concave-shaped second member including a first end portion and a second end portion, the first end portion at which a locking portion is provided to be locked to a first end of the first member, the second end portion which is opposed to the locking portion and is connected to a second end of the first member via an integral hinge, the second member containing one of the two conductor portions inside a closed cross-section formed between the first member and the second member.

A terminal portion molding method of a foreign object detection sensor for molding a terminal portion of the foreign object detection sensor, the foreign object detection sensor including an elongated hollow sheath having insulating property and elasticity, two conductive members having conductivity and elasticity and extending along a longitudinal direction of the sheath while being separated from each other inside the sheath, and two core wires respectively buried in the two conductive members and that detects existence of a foreign object by the two core wires being electrically connected to each other in association with elastic deformation of the sheath due to pressing force from a foreign object, the method including a spacer mounting process of, while two exposed conductor portions of lead wires are respectively connected to two core wires drawn out of an end portion of the sheath, inserting a spacer into a space between the two conductive members at the end portion of the sheath, and an injection molding process of setting a molding die in such a way as to cover the end portion of the sheath, the two conductor portions, and at least a part of the spacer, and injecting and solidifying a melted molding material into the molding die. The spacer includes a first member including an insertion portion configured to be inserted into a space between the two conductive members, and a concave-shaped second member including a first end portion and a second end portion, the first end portion at which a locking portion is provided to be locked to a first end of the first member, the second end portion which is opposed to the locking portion and is connected to a second end of the first member via an integral hinge. The spacer mounting process causes, by, after inserting the insertion portion of the first member into a space between the two conductive members while the locking portion is released, turning the second member about the integral hinge as a fulcrum and thereby locking the locking portion to the first end of the first member, one of the two conductor portions to be contained in a closed cross-section formed between the first member and the second member.

BRIEF DESCRIPTION OF THE DRAWINGS

The foregoing and additional features and characteristics of this disclosure will become more apparent from the following detailed description considered with the reference to the accompanying drawings, wherein:

FIG. 10 is still another explanatory diagram illustrating how the spacer mounting process proceeds;

FIG. 11 is an explanatory diagram illustrating how an injection molding process proceeds;

DETAILED DESCRIPTION

An embodiment disclosed here will be explained with reference to the attached drawings.

Figure 1A:
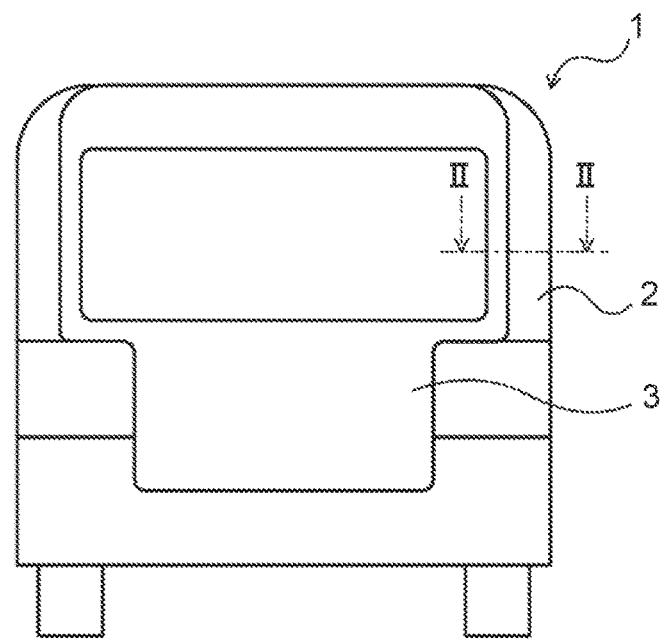
FIGS. 1A and 1B are external views of a vehicle.
Figure 1B:
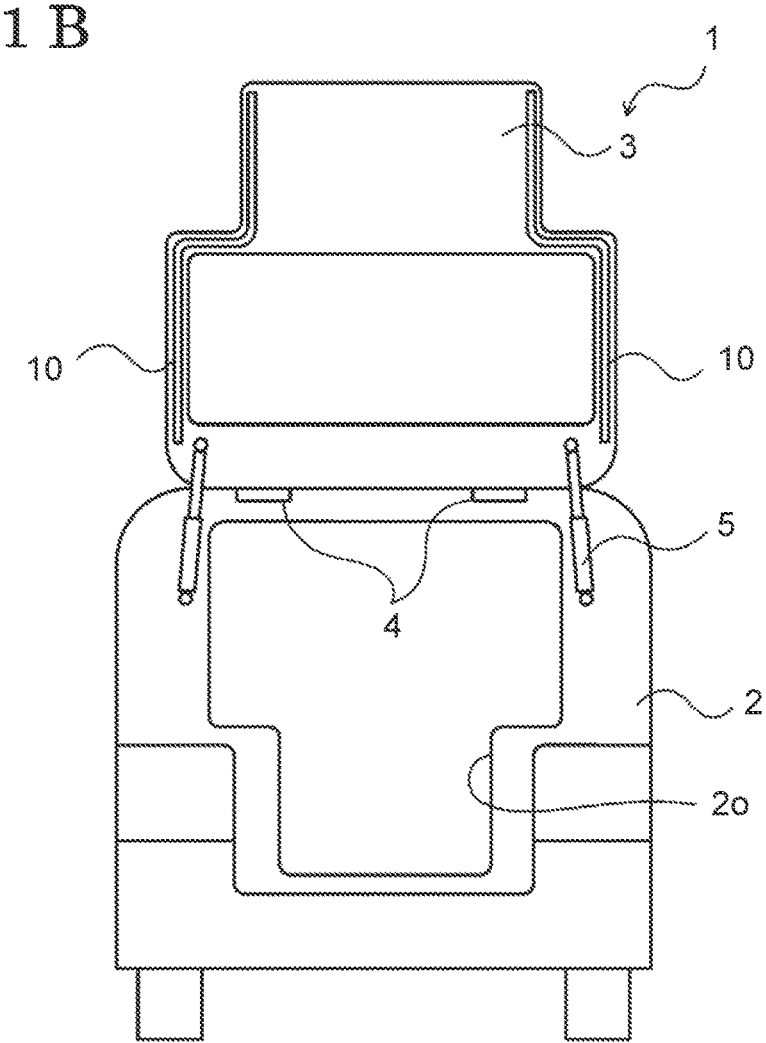
Figure 2:
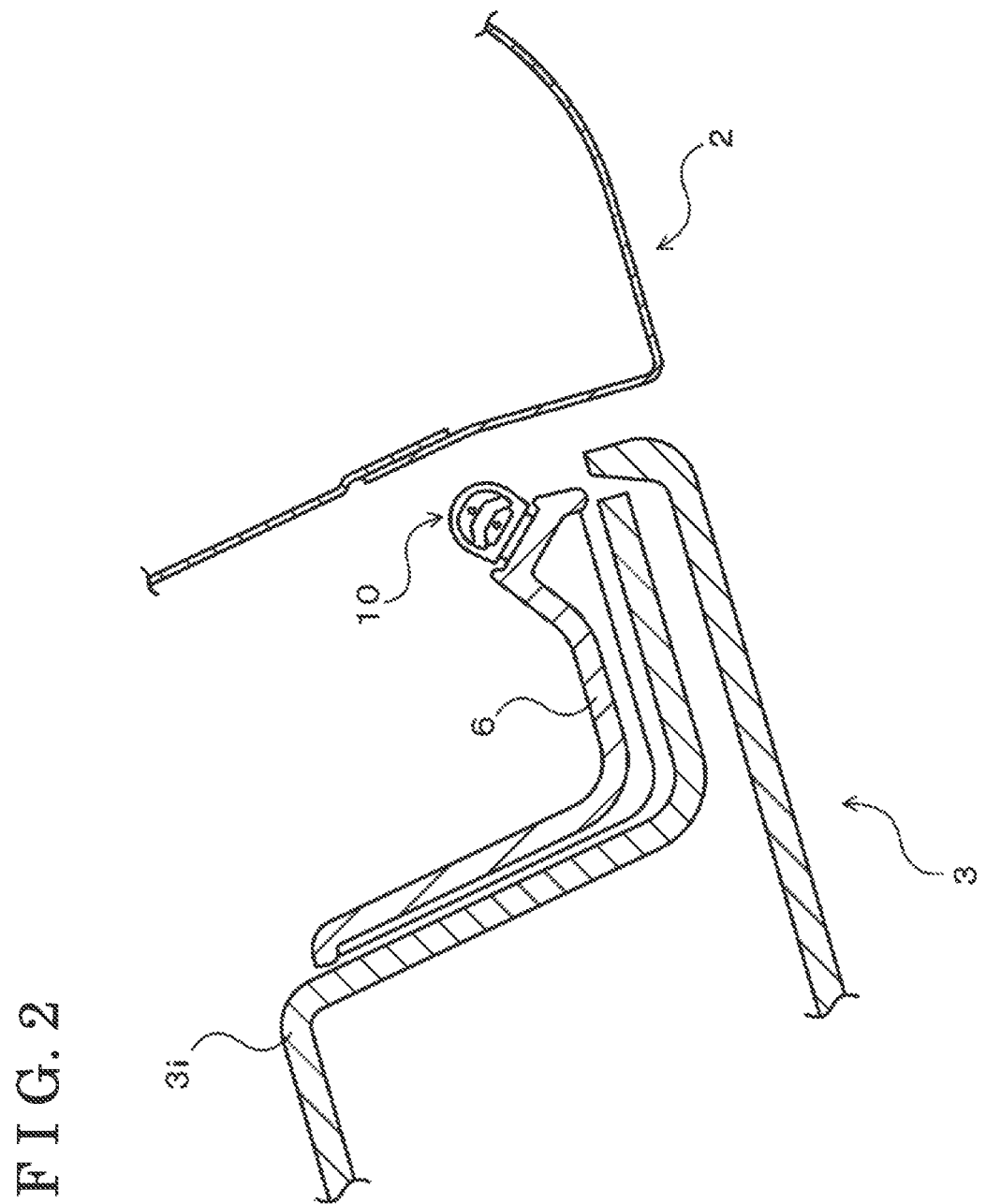
FIG. 2 is a cross-sectional view illustrating a cross-section taken along line II-II in FIG. 1A.
Figure 3:
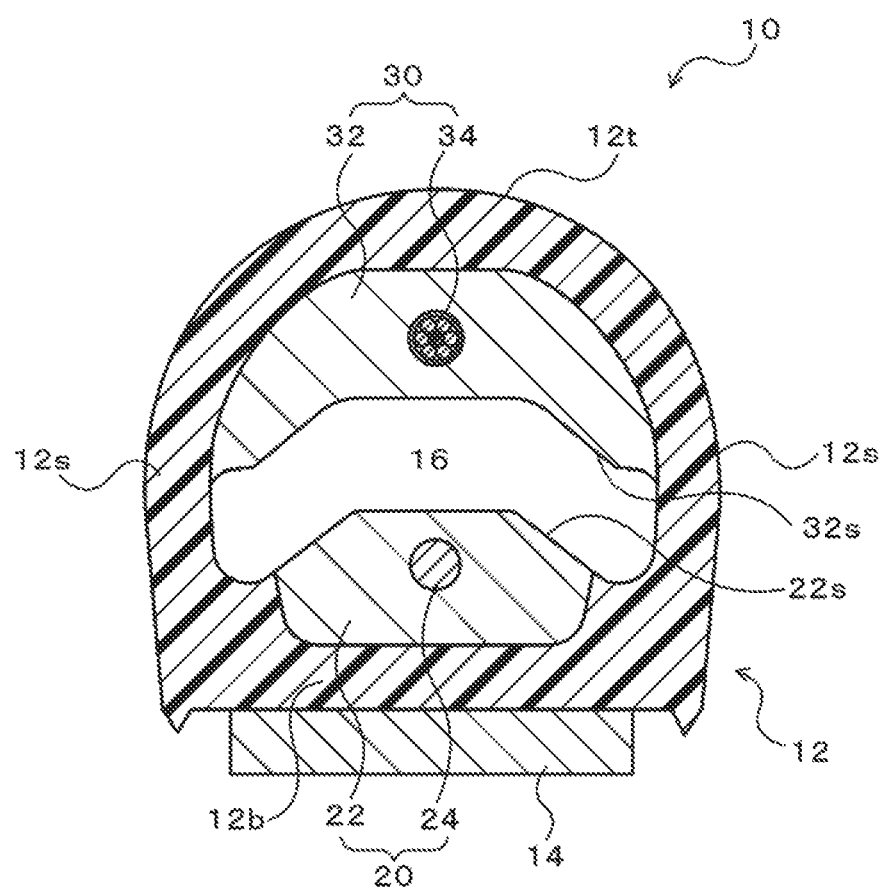
FIG. 3 is a cross-sectional view of a foreign object detection sensor.

FIGS. 1, 2, and 3 are external views of a vehicle 1, a cross-sectional view taken along line II-II in FIG. 1, and a cross-sectional view of a foreign object detection sensor 10, respectively. As illustrated in FIG. 1, the vehicle 1 includes a vehicle body 2 that has an opening portion 2o on a rear portion thereof, a door panel (back door panel) 3 that is mounted on the vehicle body 2 in such a way as to cover the opening portion 2o, and electric door opening/closing devices 5 that are interposed between the vehicle body 2 and the door panel 3 and, by moving the door panel 3 by means of driving actuators, open and close the opening portion 2o. In the embodiment, the door panel 3 is configured as a flip-up door an upper end portion of which is connected to an upper end portion of a rear portion of the vehicle body 2 via hinges 4 and a lower end portion of which turns about the hinges 4 as a fulcrum in the vertical direction.

On a peripheral portion of the door panel 3, the foreign object detection sensors 10 each of which detects a foreign object pinched between the peripheral portion of the door panel 3 and a peripheral portion of the opening portion 2o of the vehicle body 2 are disposed.

Each foreign object detection sensor 10 is an elongated elastic string-like member and, as illustrated in FIG. 2, is fixed to each of both end portions in the right and left direction of an inner panel 3i (a panel on the vehicle interior side) of the door panel 3 via a bracket 6. Each bracket 6 is an elongated member extending in the vertical direction on each of both end portions in the right and left direction of the door panel 3, and each foreign object detection sensor 10 is, while being curved along the outer shape of the bracket 6, attached to the bracket 6 with double-faced adhesive tape.

As illustrated in FIG. 3, each foreign object detection sensor 10 includes an elastically deformable sheath 12 that is formed of an insulating elastomer into an elongated and tubular shape, and a first electrode portion 20 and a second electrode portion 30 that are arranged inside the sheath 12 and extend along the longitudinal direction of the sheath 12 in parallel with each other with a predetermined space 16 interposed therebetween.

The sheath 12 is an elongated tubular body a cross-section of which is formed into a substantially D-shape and is formed of a bottom portion 12b that has, on the outer surface side thereof, a band-shaped mounting portion 14 (attachment surface) to be mounted on the bracket 6, a pair of side portions 12s that are vertically arranged on both sides of the bottom portion 12b, and a top portion 12t that connects the upper ends of the pair of side portions 12s to each other in an arc shape.

The first electrode portion 20 includes a first conductive member 22 that has conductivity and elasticity and extends along the longitudinal direction of the sheath 12, and a first core wire 24 that is buried inside the first conductive member 22 and extends along the extending direction of the first conductive member 22. The first conductive member 22 is arranged on the inner surface side of the bottom portion 12b of the sheath 12. The first core wire 24 is formed of copper or the like as a single wire in the embodiment.

The second electrode portion 30 includes a second conductive member 32 that has conductivity and elasticity and extends along the longitudinal direction of the sheath 12, and a second core wire 34 that is buried inside the second conductive member 32 and extends along the extending direction of the second conductive member 32. The second conductive member 32 is arranged on the inner surface side of the top portion 12t of the sheath 12. The second core wire 34 is formed of a string-like core material having elasticity (stretching property), such as rubber, a plurality of conductive wires wound spirally around the core material, and conductive fibers that cover the core material and the conductive wires in such a way as to have a lower modulus of elasticity than the first core wire 24. However, the second core wire 34 may, as with the first core wire 24, be formed as a single wire.

The sheath 12 and the first and second electrode portions 20 and 30 are produced by extrusion molding. The extrusion molding is performed by feeding the first and second core wires 24 and 34 through a crosshead of an extruder, extrusion-coating conductive elastomers (the first and second conductive members 22 and 32) on the outer peripheries of the first and second core wires 24 and 34 in the crosshead, thereby forming the first and second electrode portions 20 and 30, extrusion-coating an insulating elastomer on the circumference of the first and second electrode portions 20 and 30, thereby forming the sheath 12, and taking out a molded product through a cooling tank.

Figure 4A:
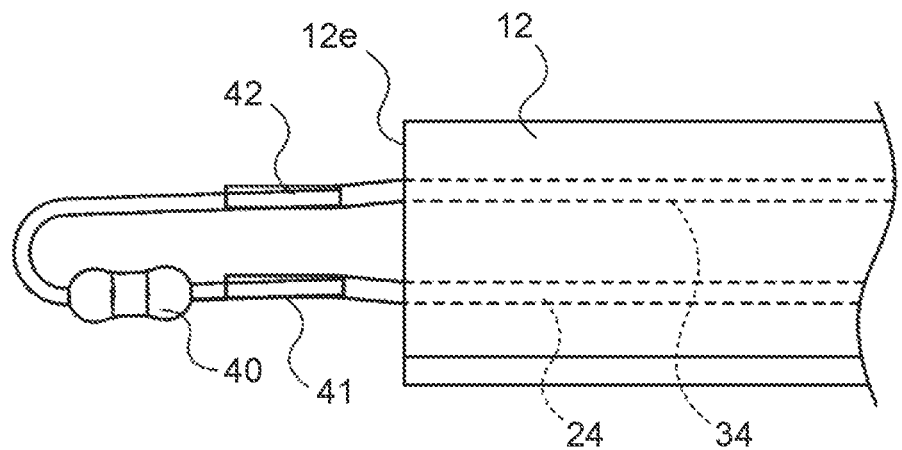
FIGS. 4A, 4B, and 4C are external views of terminal portions of a sheath and first and second electrode portions.
Figure 4B:
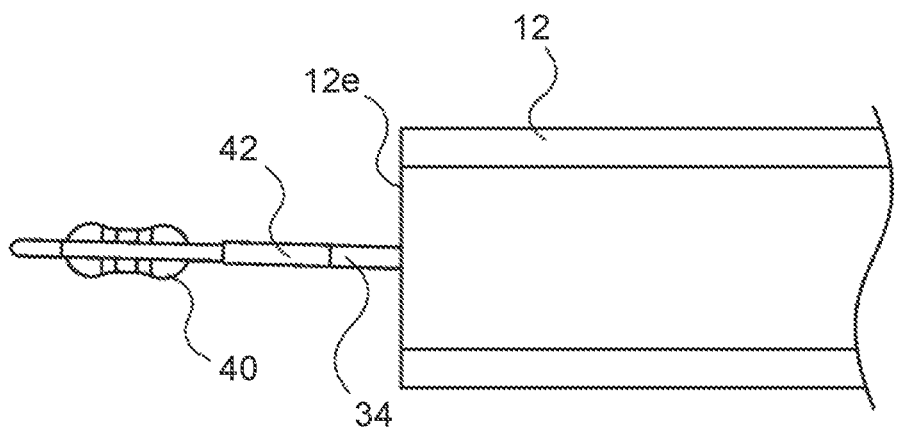
Figure 4C:
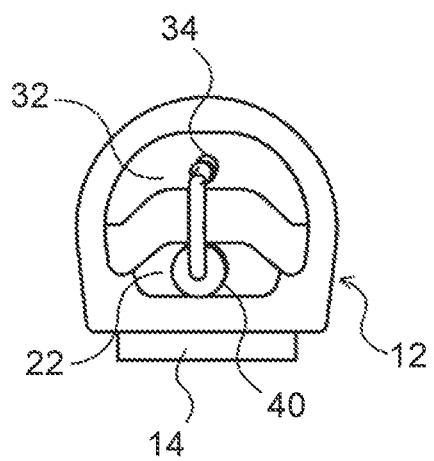
Figure 5A:
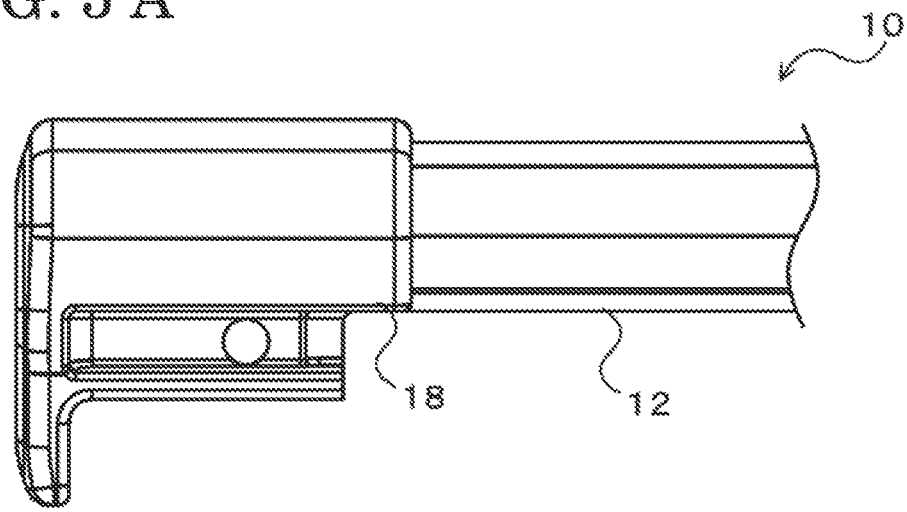
FIGS. 5A, 5B, and 5C are external views of a sensor terminal portion.
Figure 5B:
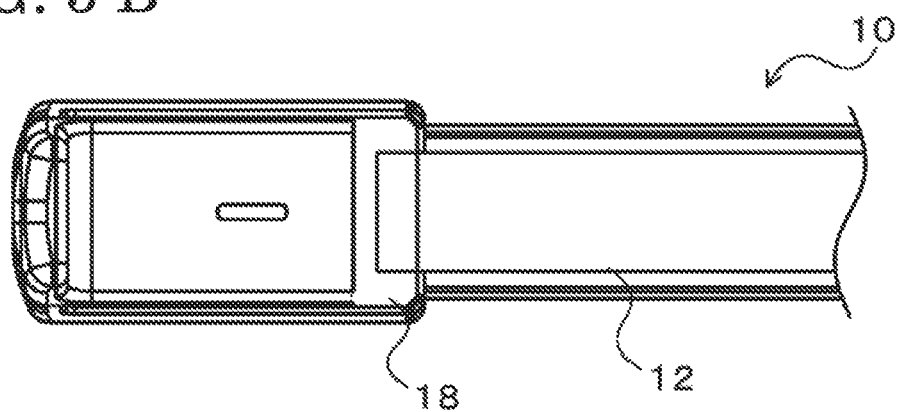
Figure 5C:
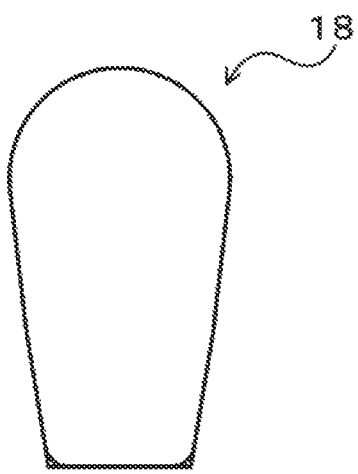

FIGS. 4A to 4C are external views of end portions of the sheath 12 and the first and second electrode portions 20 and 30. FIGS. 5A to 5C are external views of a sensor terminal portion 18. Note that FIGS. 4A and 5A, FIGS. 4B and 5B, and FIGS. 4C and 5C illustrate side views, bottom plan views, and end views, respectively. As illustrated in FIGS. 4A to 4C, one end of the first core wire 24 and one end of the second core wire 34 are drawn out of one end portion 12e of the sheath 12 and connected to two lead wires of a resistor 40. The one end portion 12e of the sheath 12, two wire connection portions 41 and 42, and the resistor 40 are covered with an insulating elastomer (for example, a styrenic thermoplastic elastomer insulating material) by injection molding, as a result of which, as illustrated in FIGS. 5A to 5C, the sensor terminal portion 18 is formed. On the other hand, another end of the first core wire 24 and another end of the second core wire 34, although not illustrated, are drawn out of another end portion of the sheath 12 and respectively connected to two lead wires that extend from a wire harness connected to a control device. As with the sensor terminal portion 18, another end portion of the sheath 12 and the two wire connection portions are covered with an insulating elastomer by injection molding, as a result of which another sensor terminal portion is formed. The control device includes a DC power source that applies current to the first core wire 24, and a resistance detection circuit that detects a resistance value between the first core wire 24 and the second core wire 34. Generally, the first electrode portion 20 (the first conductive member 22) and the second electrode portion 30 (the second conductive member 32) are separated from each other and current applied to the first core wire 24 of the first electrode portion 20 flows to the second core wire 34 of the second electrode portion 30 via the resistor 40. On the other hand, when the sheath 12 is pressed substantially flat by a foreign object and the first electrode portion 20 (the first conductive member 22) and the second electrode portion 30 (the second conductive member 32) thereby come into contact with each other, the first core wire 24 and the second core wire 34 electrically short-circuit, which causes current applied to the first core wire 24 to flow to the second core wire 34 without flowing through the resistor 40. Therefore, the control device is able to detect existence of the foreign object by detecting change in the resistance value between the first core wire 24 and the second core wire 34. A facing surface 22s of the first conductive member 22 that faces the second conductive member 32 is formed into a convex shape and a facing surface 32s of the second conductive member 32 that faces the first conductive member 22 is formed into a concave shape, and the space 16 between the first conductive member 22 and the second conductive member 32 is thereby formed into an inverse V-shape. This configuration causes the first conductive member 22 and the second conductive member 32 to easily come into contact with each other from whatever direction an external force from a foreign object is exerted on the top portion 12t and the side portions 12s, which enables the foreign object detection sensor 10 to detect a foreign object more surely. Note that each of the facing surface 22s of the first conductive member 22 and the facing surface 32s of the second conductive member 32 may be formed with a flat surface.

Figure 6A:
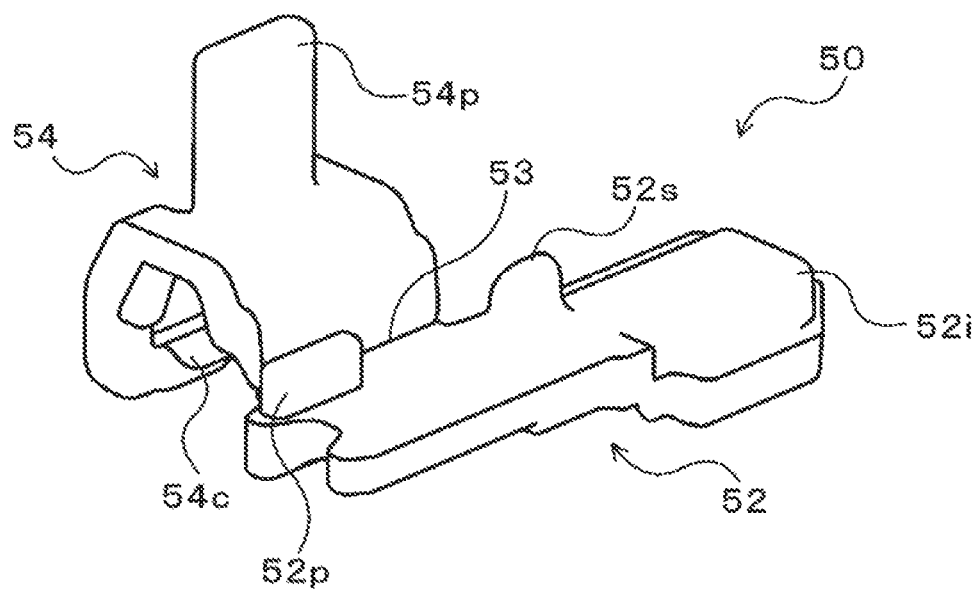
FIGS. 6A and 6B are external perspective views of a spacer used in a spacer mounting process.
Figure 6B:
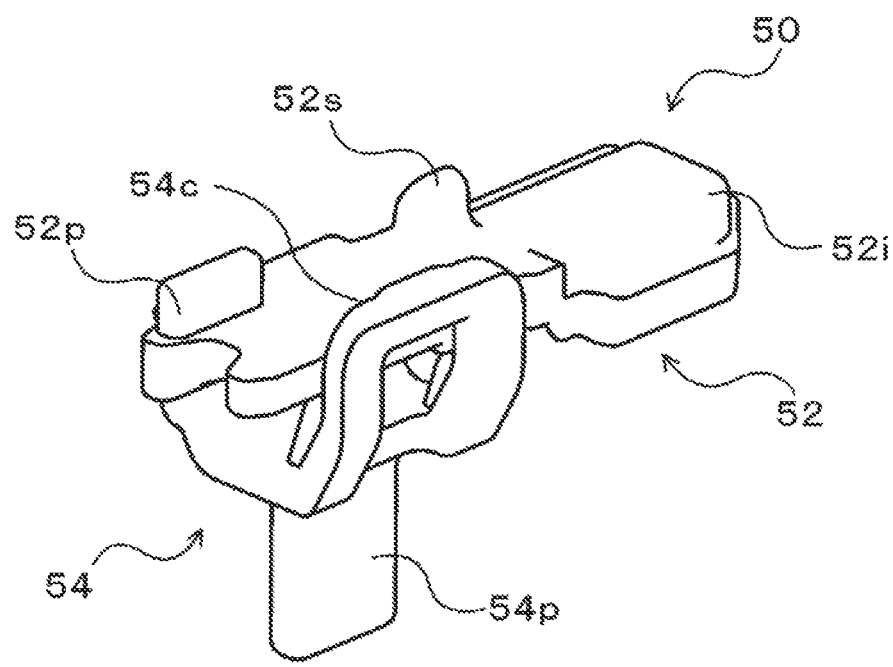

Next, a molding process of a terminal portion (the sensor terminal portion 18) of each foreign object detection sensor 10, which is configured as described above, will be explained. The molding process of the sensor terminal portion 18 mainly includes a spacer mounting process and an injection molding process. FIGS. 6A and 6B are external perspective views of a spacer 50 that is used in the spacer mounting process. FIGS. 7 to 10, and FIGS. 11 and 12 are explanatory diagrams illustrating how the spacer mounting process proceeds, and explanatory diagrams illustrating how the injection molding process proceeds, respectively. The spacer 50 is formed of an insulating material (for example, polypropylene) having a lower melting point than a material (a molding material) forming the sensor terminal portion 18 and has a surface thereof being formed with a fine uneven surface, such as a satin surface. As illustrated in FIGS. 6A and 6B, the spacer 50 includes a substantially band-plate-shaped first member 52 and a concave-shaped second member 54 one end portion of which has a locking claw 54c (locking portion) disposed thereon to be locked to one end portion (the right end portion in FIG. 6) in the width direction of the first member 52, and the other end portion of which is connected to the other end portion (the left end portion in FIG. 6) in the width direction of the first member 52 via an integral hinge portion 53. The first member 52 includes an insertion portion 52i disposed to be inserted (press-fitted) into the space 16 between the first electrode portion 20 (the first conductive member 22) and the second electrode portion 30 (the second conductive member 32) at the end portion 12e of the sheath 12. The first member 52 also includes, on the other end portion (the left end portion in FIG. 6) side in the width direction, a protruding portion 52s that protrudes upward in FIG. 6 and abuts against the end face of the second conductive member 32 at the time of insertion of the insertion portion 52i, thereby positioning the spacer 50. The first member 52 further includes, on the other end portion side in the width direction, a protruding portion 52p that protrudes in the same direction as the protruding portion 52s. In the embodiment, the insertion portion 52i has a cross-sectional shape formed into a substantially V-shape that is substantially the same as the shape of the space 16 in such a way as to be press-fitted into the space 16 without a gap. The second member 54 has a projecting portion 54p disposed that projects downward in FIG. 6 while the locking claw 54c is locked to the one end portion of the first member 52.

Figure 7:
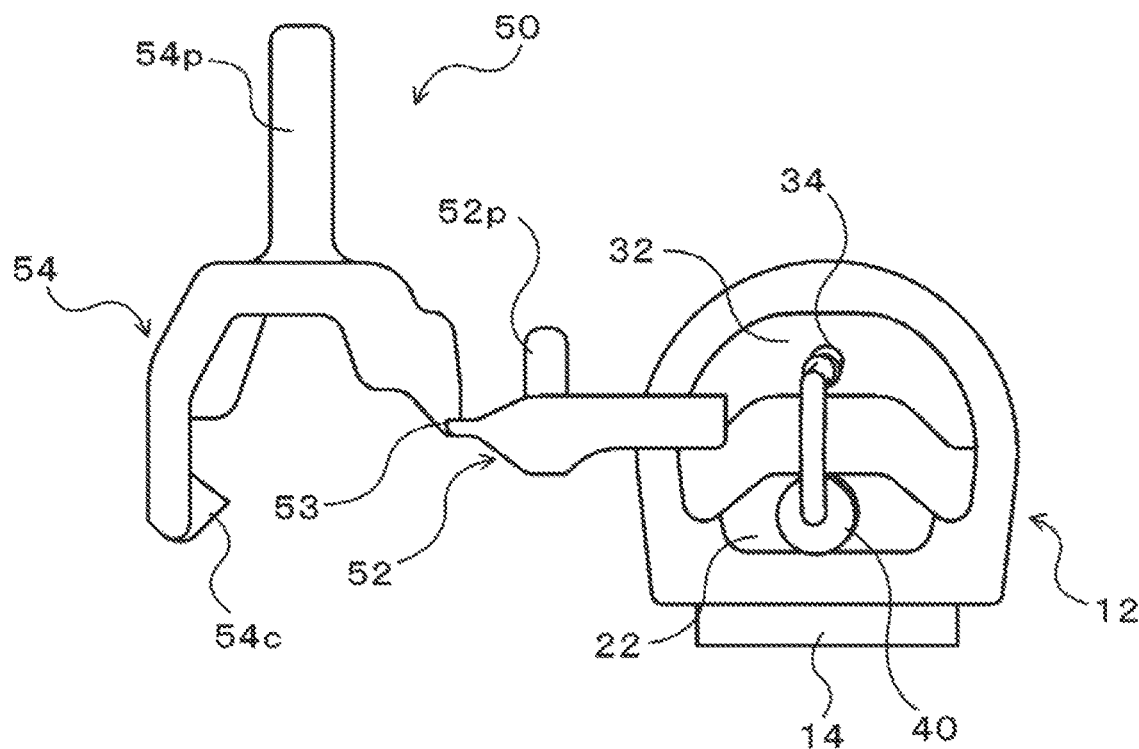
FIG. 7 is an explanatory diagram illustrating how the spacer mounting process proceeds.
Figure 8:
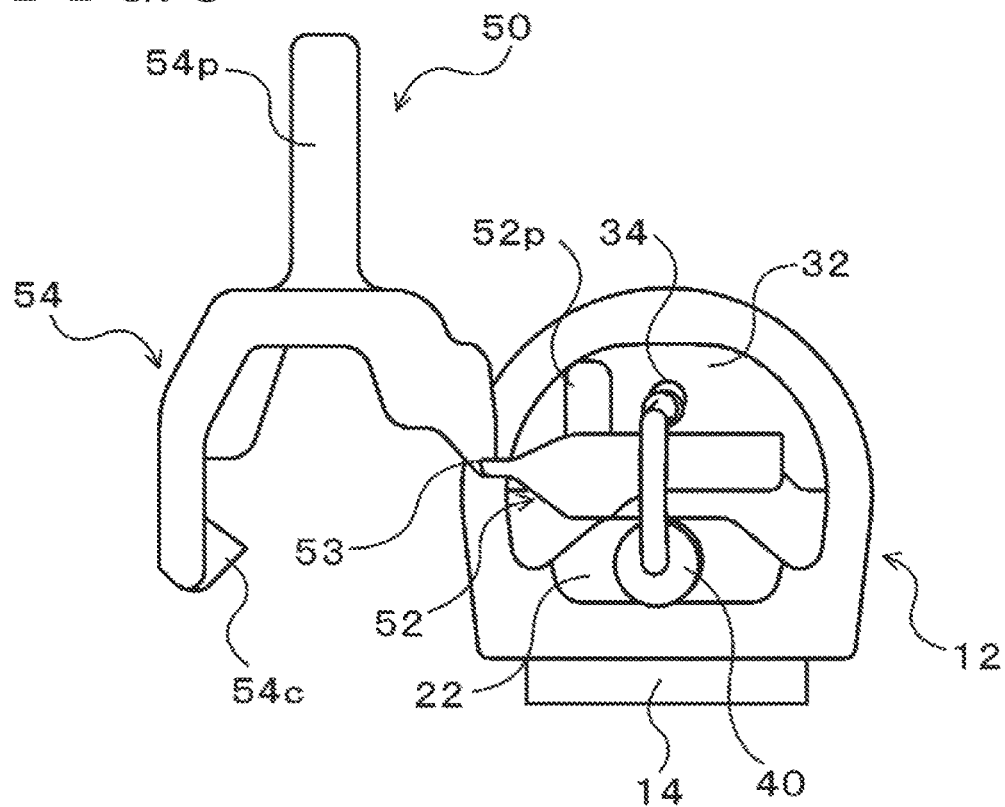
FIG. 8 is another explanatory diagram illustrating how the spacer mounting process proceeds.
Figure 9A:
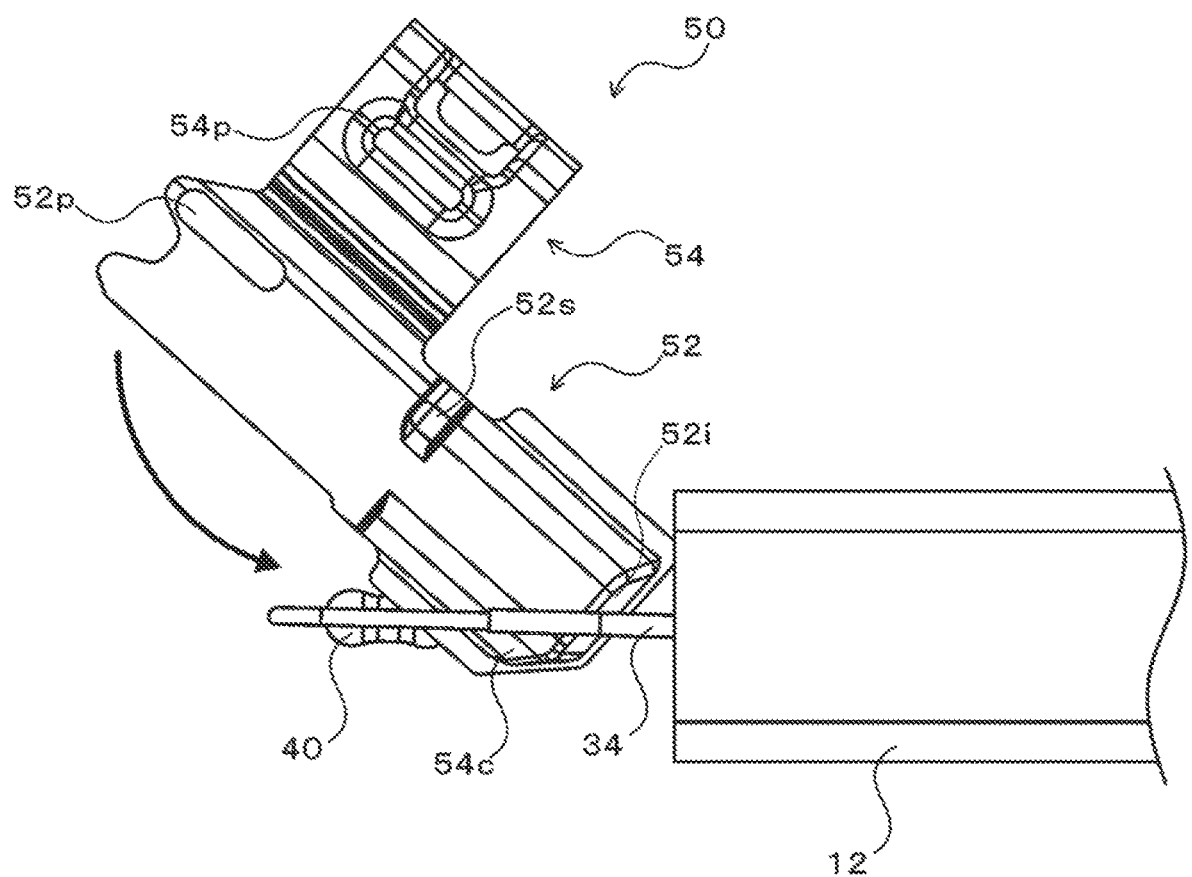
FIGS. 9A and 9B are still another explanatory diagrams illustrating how the spacer mounting process proceeds.
Figure 9B:
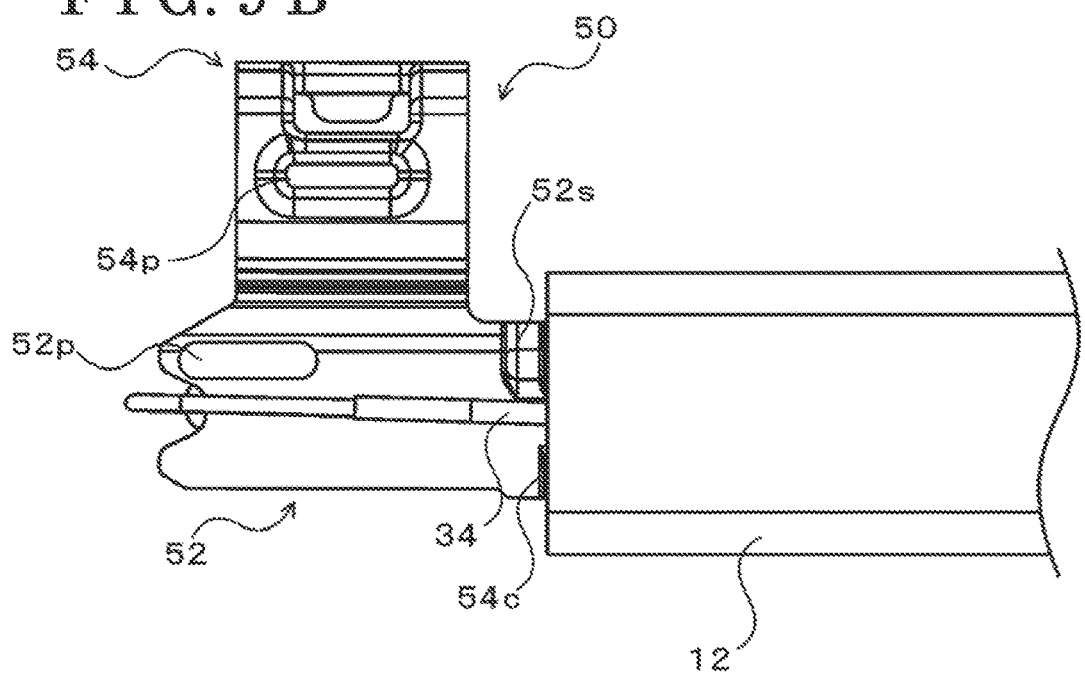

In the spacer mounting process, the first member 52 of the spacer 50 is inserted between the two wire connection portions 41 and 42 in an oblique direction with respect to a mounting direction (a press-fitting direction), and the insertion portion 52i of the first member 52 is press-fitted into the space 16 between the first conductive member 22 and the second conductive member 32 with attitude of the first member 52 being brought to be aligned straight with the mounting direction until the protruding portion 52s abuts against the end face of the second conductive member 32, as illustrated in FIGS. 7 to 9. The second member 54 is turned about the integral hinge portion 53 as a fulcrum with respect to the first member 52, and the locking claw 54c of the second member 54 is locked to the one end portion, which is on the opposite side to the integral hinge portion 53, of the first member 52. This process causes one wire connection portion 41 of the two wire connection portions 41 and 42 to be contained in a closed cross-section 56 that is formed by the first member 52 and the second member 54, and insulation of the one wire connection portion 41 from the other wire connection portion 42 to be thereby obtained. Since the protruding portions 52s and 52p are formed at the other end portion (the left end portion in FIG. 10) of the first member 52 in such a way as to protrude to the opposite side to the closed cross-section 56, and the locking claw 54c is formed in such a way as to protrude from the first member 52 in the same direction (upward in FIG. 10) as the protruding portion 52s on the one end portion (the right end portion in FIG. 10) of the first member 52, the other wire connection portion 42 is positioned by being surrounded in a concave shape between the protruding portions 52s and 52p and the locking claw 54c.

Figure 12:
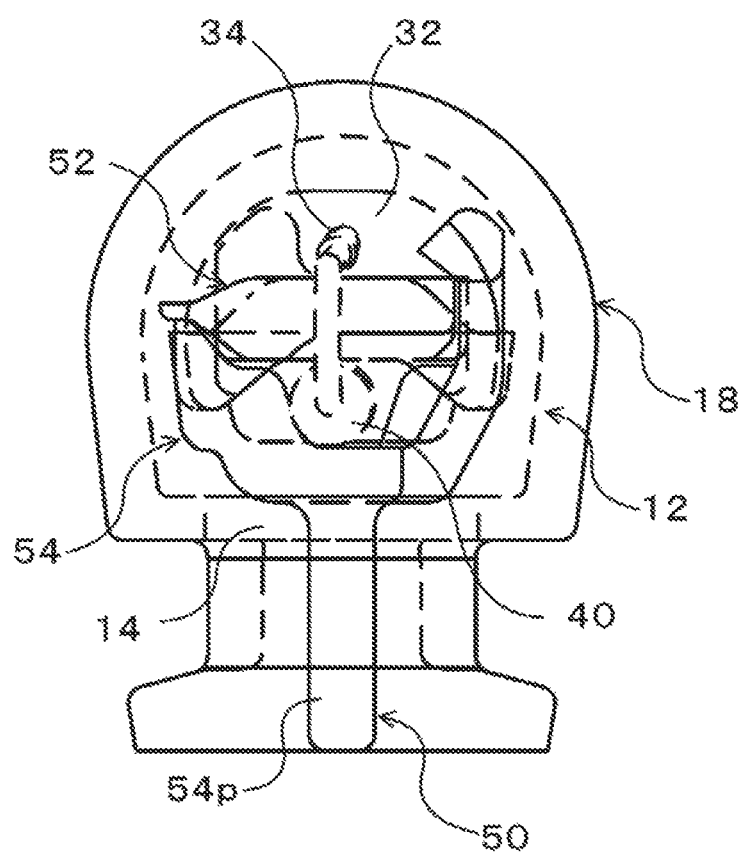
FIG. 12 is another explanatory diagram illustrating how the injection molding process proceeds.

The injection molding process is performed by setting two molding dies 62 and 64 in such a way as to cover the end portion 12e of the sheath 12, the two wire connection portions 41 and 42, the resistor 40, and the spacer 50, and, after injecting a molding material into an injection port 66 disposed to an upper portion in FIG. 11, cooling and solidifying the molding material, as illustrated in FIGS. 11 and 12. The injection molding process is performed by, while the one wire connection portion 41 is contained in the closed cross-section 56 formed by the first member 52 and the second member 54, and the other wire connection portion 42 is surrounded by the protruding portions 52s and 52p of the first member 52 and the locking claw 54c of the second member 54 in a concave shape, injecting a molding material from the injection port 66 disposed on the opening side of the concave shape. The process performed as described above enables displacement of the two wire connection portions 41 and 42 due to injection pressure to be effectively inhibited from occurring and excellent insulation between the two wire connection portions 41 and 42 to be obtained. The injection molding process is also performed by using a molding material having a higher melting point than a melting point of the spacer 50 and injecting the molding material melted under a higher temperature than the melting point of the spacer 50, in the embodiment. This process causes a surface of the spacer 50 to be melted and welding strength between the spacer 50 and the molding material to be thereby increased, which enables the molding material to be prevented from being peeled off. In addition, since the spacer 50 has the surface formed with a satin-like fine uneven surface as described above, it is possible to increase a contact area with the molding material and further increase welding strength with the molding material. Further, in the injection molding process, since an outer side of the one end portion (the right end portion in FIG. 11) of the second member 54 is formed with a convex curved surface portion 54r that curves along the outer shape of the sheath 12, as illustrated in FIG. 11, it is possible to reduce occurrence of deformation of the sheath 12 or residual stress due to injection pressure and thereby prevent the sheath 12 and the molding material (the sensor terminal portion 18) from being peeled off from each other.

Figure 13A:
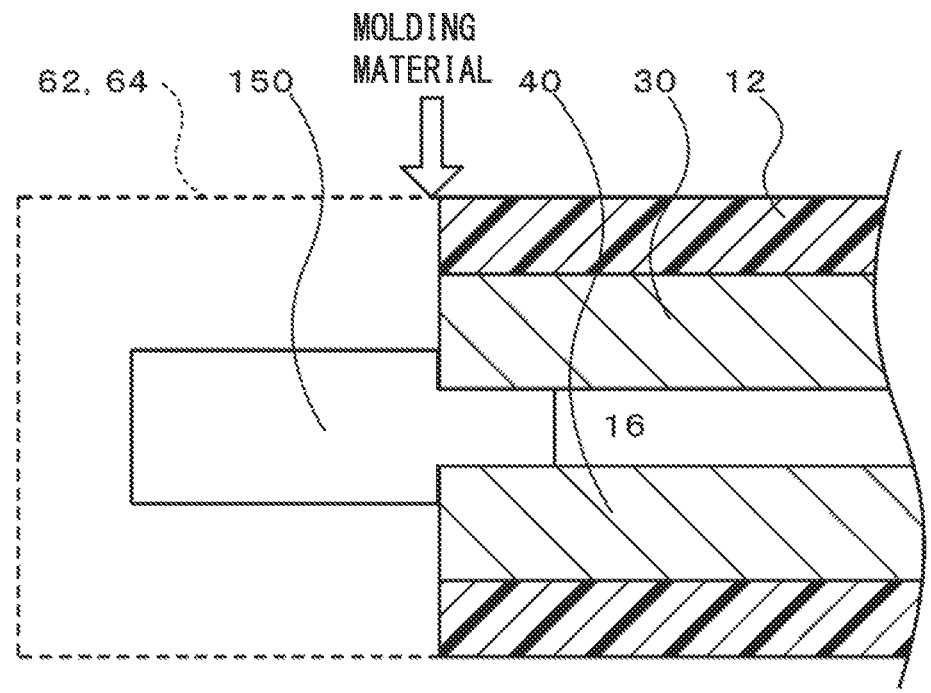
FIGS. 13A and 13B are explanatory diagrams illustrating how an injection molding process using a spacer according to a comparative example proceeds.
Figure 13B:
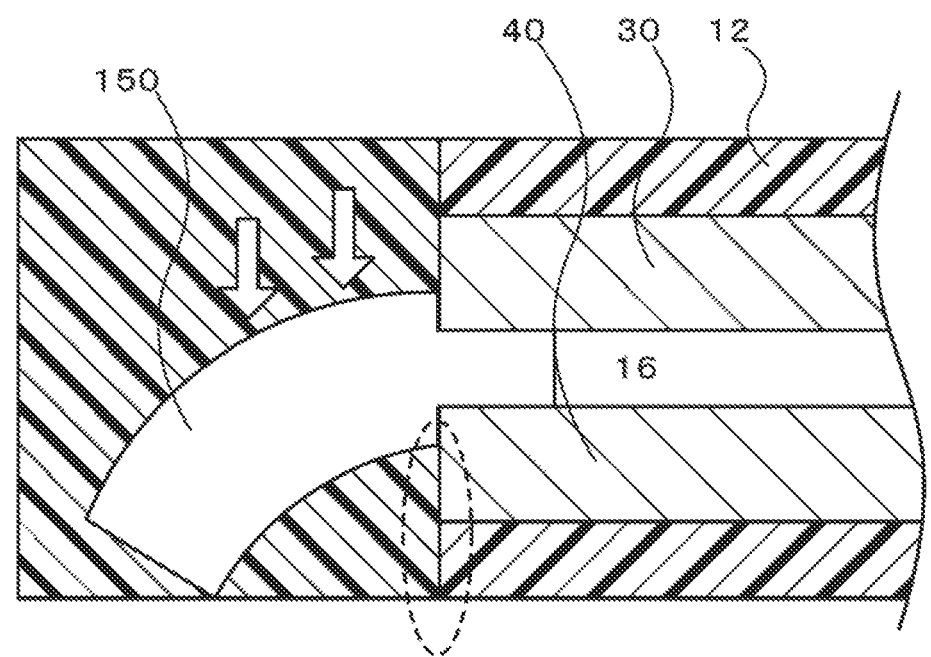

The injection molding process is also performed while the tip of the projecting portion 54p of the second member 54 abuts against an inner wall on the opposite side to the injection port 66 of the molding dies 62 and 64, as illustrated in FIG. 11. A case is herein considered where a sensor terminal portion is formed by press-fitting a spacer 150 as a comparative example that does not include a projecting portion 54p into a space 16 between a first electrode portion 30 and a second electrode portion 40, setting molding dies 62 and 64, and injecting a molding material from an injection port disposed on an upper portion, as illustrated in FIGS. 13A and 13B. In this case, the end portion of the spacer 150 on the opposite side to the inserted portion is deformed by injection pressure directed from the upper side to the lower side, and the molding material is solidified while the end portion is deformed, as a result of which a sheath 12 and the molding material are easily peeled off from each other due to residual stress in an area surrounded by an ellipse in FIG. 13B. In the embodiment, since the injection molding is performed while the projecting portion 54p of the spacer 50 abuts against the inner wall on the opposite side to the injection port 66 of the molding dies 62 and 64, it is possible to inhibit the spacer 50 from being deformed due to injection pressure. Therefore, it is possible to reduce occurrence of residual stress and prevent the sheath 12 and the molding material (the sensor terminal portion 18) from being peeled off from each other.

Although not illustrated, molding of the other sensor terminal portion of each foreign object detection sensor 10 can also be produced through the same spacer mounting process and injection molding process except that the other sensor terminal portion includes a drawn-out portion of lead wires connected to the control device.

The spacer 50 for the foreign object detection sensor of the embodiment explained thus far includes the first member 52 having the insertion portion 52i to be inserted into the space 16 between the two conductive members 22 and 32, and the concave-shaped second member 54 one end portion of which has the locking claw 54c disposed thereon to be locked to one end portion of the first member 52, and another end portion of which opposed to the locking claw 54c is connected to another end portion of the first member 52 via the integral hinge portion 53. Because of this configuration, by turning, after inserting the insertion portion 52i of the first member 52 into the space 16 between the two conductive members 22 and 32 while the locking claw 54c is released, the second member 54 about the integral hinge portion 53 as a fulcrum, and thereby locking the locking claw 54c to the first member 52, the spacer 50 can be mounted between the two wire connection portions 41 and 42 in such a way that the one wire connection portion 41 is contained in the closed cross-section 56 formed by the first and second members 52 and 54. As a result, it is possible to improve workability and excellently inhibit displacement of the wire connection portions 41 and 42 due to injection pressure from occurring in the process of injection-molding the sensor terminal portion 18.

The spacer 50 of the embodiment also has, on the first member 52, the protruding portions 52s and 52p that protrude to the opposite side to the closed cross-section 56 formed between the first member 52 and the second member 54 and restrict the other wire connection portion 42 from moving. This configuration enables the other wire connection portion 42 to be excellently inhibited from being displaced at the time of injection molding. The protruding portions 52s and 52p are configured to be disposed on the other end portion side of the first member 52, and the locking claw 54c is formed in such a way as to protrude from the one end portion of the first member 52 in the same direction as the protruding portion 52s while being locked to the first member 52. This configuration enables the other wire connection portion 42 to be positioned by being surrounded in a concave shape between the protruding portions 52s and 52p of the first member 52 and the locking claw 54c of the second member 54, which enables the wire connection portion 42 to be more excellently inhibited from being displaced.

The spacer 50 of the embodiment also has a surface formed with a satin-like fine uneven surface. This configuration enables a contact area between the molding material and the spacer 50 to be increased and welding strength between the molding material and the spacer 50 to be further increased at the time of injection molding.

Further, the spacer 50 of the embodiment has, on the outer side of the one end portion of the second member 54, the convex curved surface portion 54r that curves along the outer shape of the sheath 12. This configuration enables occurrence of deformation of the sheath 12 or residual stress due to injection pressure to be reduced at the time of injection molding and the sheath 12 and the molding material to be prevented from being peeled off from each other.

The spacer 50 of the embodiment is formed of a material having a lower melting point than the molding material. This configuration enables a surface of the spacer 50 to be melted and welding strength between the spacer 50 and the molding material to be thereby further increased when the molding material melted under a high temperature is injected.

The spacer 50 of the embodiment has, on the second member 54, the projecting portion 54p that projects in such a way that, while the molding dies 62 and 64 are set, the tip thereof abuts against the inner wall on the opposite side to the injection port 66 for injecting the molding material in the molding dies 62 and 64. This configuration enables occurrence of deformation of the spacer or residual stress due to injection pressure to be reduced at the time of injection molding and the sheath 12 and the molding material to be prevented from being peeled off from each other.

Although it is assumed that the protruding portion 52p is formed on the first member 52 of the spacer 50 in the embodiment described above, the protruding portion 52p may be omitted. Although it is also assumed that the projecting portion 54p is formed on the second member 54 of the spacer 50, the projecting portion 54p may be omitted.

Although it is assumed that the spacer 50 has a surface formed with a satin-like fine uneven surface in the embodiment described above, the surface may be formed with a smooth surface.

Although it is assumed that the sensor terminal portion 18 is molded by means of injection molding by using the molding dies 62 and 64 which are separated into two dies in the embodiment described above, the present disclosure is not limited to the configuration and the sensor terminal portion 18 may be molded by using molding dies which are separated into three or more dies. The molding dies may also be formed in such a way that a molding material does not flow into a part of the spacer 50, that is, in such a way that a part of the spacer 50 is exposed to the outside.

Although it is assumed that the foreign object detection sensors 10 are disposed to a back door device for opening and closing the opening portion 2o disposed on the rear portion of the vehicle body 2 by moving the door panel (back door panel) 3 in the embodiment described above, the present disclosure is not limited to the configuration. The foreign object detection sensor may be disposed to any type of opening/closing device as long as the opening/closing device is a device that opens and closes an opening portion by moving an opening/closing body by means of driving an actuator, such as a foreign object detection sensor being disposed to a sliding door device that opens and closes an opening portion (a gate) disposed on a side portion of the vehicle body 2 by sliding a sliding door panel in the front-rear direction, and a foreign object detection sensor being disposed to a power window device that opens and closes an opening portion (a window) disposed on a side portion of the vehicle body 2 by raising and lowering a window glass.

The present disclosure is able to be used in a foreign object detection sensor manufacturing industry and the like.

According to the present disclosure, a spacer for a foreign object detection sensor that includes an elongated hollow sheath having insulating property and elasticity, two conductive members having conductivity and elasticity and extending along a longitudinal direction of the sheath while being separated from each other inside the sheath, and two core wires respectively buried in the two conductive members and that detects existence of a foreign object by the two core wires which are electrically connected to each other in association with elastic deformation of the sheath due to pressing force from the foreign object, the spacer that is used for a terminal portion of the foreign object detection sensor being molded by, while two exposed conductor portions of lead wires are respectively connected to the two core wires drawn out of an end portion of the sheath, setting a molding die in such a way as to cover the end portion of the sheath and the two conductor portions, and injecting and solidifying a melted molding material into the molding die, and electrically insulating the two conductor portions from each other, the spacer including a first member including an insertion portion configured to be inserted into a space between the two conductive members at the end portion of the sheath, and a concave-shaped second member including a first end portion and a second end portion, the first end portion at which a locking portion is provided to be locked to a first end of the first member, the second end portion which is opposed to the locking portion and is connected to a second end of the first member via an integral hinge, the second member containing one of the two conductor portions inside a closed cross-section formed between the first member and the second member.

The spacer for the foreign object detection sensor of the present disclosure includes the first member including the insertion portion configured to be inserted into the space between the two conductive members, and the concave-shaped second member including the first end portion and the second end portion, the first end portion at which the locking portion is provided to be locked to the first end of the first member, the second end portion which is opposed to the locking portion and is connected to the second end of the first member via the integral hinge. Because of this configuration, by, after inserting the insertion portion of the first member into the space between the two conductive members while the locking portion is released, turning the second member about the integral hinge as a fulcrum and thereby locking the locking portion to the first member, the spacer can be mounted between the two conductive portions in such a way that one of the two conductor portions is contained in the closed cross-section formed by the first and second members. As a result, for the sensor a terminal portion of which is injection-molded, it is possible to improve workability and excellently inhibit displacement of the conductor portions due to injection pressure from occurring.

In addition, the first member includes a protruding portion that protrudes to an opposite side to the closed cross-section formed between the first member and the second member and restricts the other of the two conductor portions from moving.

This configuration enables the other of the two conductor portions to be excellently inhibited from being displaced at the time of injection molding.

Further, the protruding portion is disposed on the second end side of the first member. The locking portion protrudes from the first end of the first member in substantially the same direction as the protruding portion while being locked to the first end of the first member in such a way as to surround the other of the two conductor portions in a concave shape between the protruding portion of the first member and the locking portion.

This configuration enables the other of the two conductor portions to be more excellently inhibited from being displaced. In this case, an injection port for injecting the molding material may be disposed on the opening side of the concave shape.

Furthermore, a surface of the spacer is formed with a fine uneven surface.

This configuration enables a contact area between the molding material and the spacer to be increased and welding strength between the molding material and the spacer to be further increased. As a result, the spacer and the molding material are prevented from being peeled off from each other, which eventually enables the sheath and the molding material to be prevented from being peeled off from each other.

Furthermore, an outer side of the first end portion of the second member is formed with a convex curved surface curving along an outer shape of the sheath.

This configuration enables occurrence of deformation of the sheath or residual stress due to injection pressure to be reduced at the time of injection molding and the sheath and the molding material to be prevented from being peeled off from each other.

Furthermore, the spacer is formed of a material having a lower melting point than the molding material.

This configuration enables the surface of the spacer to be melted at the time of injection molding and welding strength between the spacer and the molding material to be further increased. As a result, the spacer and the molding material are prevented from being peeled off from each other, which eventually enables the sheath and the molding material to be prevented from being peeled off from each other.

Furthermore, the spacer for the foreign object detection sensor further includes a projecting portion that projects in such a way that, while the molding die is set, a tip of the projecting portion abuts against an inner wall on an opposite side to an injection port for injecting the molding material in the molding die.

This configuration enables occurrence of deformation of the sheath or residual stress due to injection pressure to be reduced at the time of injection molding and the sheath and the molding material to be prevented from being peeled off from each other.

According to the disclosure, a terminal portion molding method of a foreign object detection sensor for molding a terminal portion of the foreign object detection sensor, the foreign object detection sensor including an elongated hollow sheath having insulating property and elasticity, two conductive members having conductivity and elasticity and extending along a longitudinal direction of the sheath while being separated from each other inside the sheath, and two core wires respectively buried in the two conductive members and that detects existence of a foreign object by the two core wires being electrically connected to each other in association with elastic deformation of the sheath due to pressing force from a foreign object, the method including a spacer mounting process of, while two exposed conductor portions of lead wires are respectively connected to two core wires drawn out of an end portion of the sheath, inserting a spacer into a space between the two conductive members at the end portion of the sheath, and an injection molding process of setting a molding die in such a way as to cover the end portion of the sheath, the two conductor portions, and at least a part of the spacer, and injecting and solidifying a melted molding material into the molding die. The spacer includes a first member including an insertion portion configured to be inserted into a space between the two conductive members, and a concave-shaped second member including a first end portion and a second end portion, the first end portion at which a locking portion is provided to be locked to a first end of the first member, the second end portion which is opposed to the locking portion and is connected to a second end of the first member via an integral hinge. The spacer mounting process causes, by, after inserting the insertion portion of the first member into a space between the two conductive members while the locking portion is released, turning the second member about the integral hinge as a fulcrum and thereby locking the locking portion to the first end of the first member, one of the two conductor portions to be contained in a closed cross-section formed between the first member and the second member.

The terminal portion molding method of the foreign object detection sensor of the present disclosure includes the spacer mounting process of, while the exposed conductor portions of the lead wires are respectively connected to the two core wires drawn out of the end portion of the sheath, inserting the spacer into the space between the two conductive members at the end portion of the sheath, and the injection molding process of setting the molding die in such a way as to cover the end portion of the sheath, the two conductor portions, and at least a part of the spacer, and injecting and solidifying the melted molding material into the molding die. The spacer mounting process is performed by using, as a spacer, the spacer including the first member having the insertion portion to be inserted into the space between the two conductive members, and the concave-shaped second member the first end portion of which has the locking portion to be locked to the first end of the first member and the second end portion of which opposed to the locking portion is connected to the second end of the first member via the integral hinge. The spacer mounting process mounts, by, after inserting the insertion portion of the first member into the space between the two conductive members while the locking portion is released, turning the second member about the integral hinge as a fulcrum and thereby locking the locking portion to the first member, the spacer between the two conductor portions in such a way that one of the two conductor portions is contained in the closed cross-section formed by the first and second members. This process enables workability to be improved and displacement of the conductor portions due to injection pressure to be excellently inhibited from occurring, for the sensor a terminal portion of which is injection-molded.

In addition, the injection molding process is performed by injecting the molding material melted under a higher injection temperature than a melting point of the spacer.

This configuration enables the surface of the spacer to be melted at the time of injection molding and welding strength between the spacer and the molding material to be further increased. As a result, the spacer and the molding material are prevented from being peeled off from each other, which eventually enables the sheath and the molding material to be prevented from being peeled off from each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A spacer for a foreign object detection sensor that includes an elongated hollow sheath having insulating property and elasticity, two conductive members having conductivity and elasticity and extending along a longitudinal direction of the sheath while being separated from each other inside the sheath, and two core wires respectively buried in the two conductive members and that detects existence of a foreign object by the two core wires which are electrically connected to each other in association with elastic deformation of the sheath due to pressing force from the foreign object, the spacer that is used for a terminal portion of the foreign object detection sensor being molded by, while two exposed conductor portions of lead wires are respectively connected to the two core wires drawn out of an end portion of the sheath, setting a molding die in such a way as to cover the end portion of the sheath and the two conductor portions, and injecting and solidifying a melted molding material into the molding die, and electrically insulating the two conductor portions from each other, the spacer comprising:
  a first member including an insertion portion configured to be inserted into a space between the two conductive members at the end portion of the sheath; and
  a concave-shaped second member including a first end portion and a second end portion, the first end portion at which a locking portion is provided to be locked to a first end of the first member, the second end portion which is opposed to the locking portion and is connected to a second end of the first member via an integral hinge, the second member containing one of the two conductor portions inside a closed cross-section formed between the first member and the second member, wherein
  the first member includes a protruding portion that protrudes to an opposite side to the closed cross-section formed between the first member and the second member and restricts the other of the two conductor portions from moving.

2. The spacer for the foreign object detection sensor according to claim 1, wherein
  the protruding portion is disposed on the second end side of the first member, and
  the locking portion protrudes from the first end of the first member in substantially the same direction as the protruding portion while being locked to the first end of the first member in such a way as to surround the other of the two conductor portions in a concave shape between the protruding portion of the first member and the locking portion.

3. The spacer for the foreign object detection sensor according to claim 1, wherein
  a surface of the spacer is formed with a fine uneven surface.

4. A spacer for a foreign object detection sensor that includes an elongated hollow sheath having insulating property and elasticity, two conductive members having conductivity and elasticity and extending along a longitudinal direction of the sheath while being separated from each other inside the sheath, and two core wires respectively buried in the two conductive members and that detects existence of a foreign object by the two core wires which are electrically connected to each other in association with elastic deformation of the sheath due to pressing force from the foreign object, the spacer that is used for a terminal portion of the foreign object detection sensor being molded by, while two exposed conductor portions of lead wires are respectively connected to the two core wires drawn out of an end portion of the sheath, setting a molding die in such a way as to cover the end portion of the sheath and the two conductor portions, and injecting and solidifying a melted molding material into the molding die, and electrically insulating the two conductor portions from each other, the spacer comprising:
  a first member including an insertion portion configured to be inserted into a space between the two conductive members at the end portion of the sheath; and
  a concave-shaped second member including a first end portion and a second end portion, the first end portion at which a locking portion is provided to be locked to a first end of the first member, the second end portion which is opposed to the locking portion and is connected to a second end of the first member via an integral hinge, the second member containing one of the two conductor portions inside a closed cross-section formed between the first member and the second member, wherein
  an outer side of the first end portion of the second member is formed with a convex curved surface curving along an outer shape of the sheath.

5. The spacer for the foreign object detection sensor according to claim 1, wherein
  the spacer is formed of a material having a lower melting point than the molding material.

6. The spacer for the foreign object detection sensor according to claim 1, further comprising
  a projecting portion that projects in such a way that, while the molding die is set, a tip of the projecting portion abuts against an inner wall on an opposite side to an injection port for injecting the molding material in the molding die.

7. A terminal portion molding method of a foreign object detection sensor for molding a terminal portion of the foreign object detection sensor, the foreign object detection sensor including an elongated hollow sheath having insulating property and elasticity, two conductive members having conductivity and elasticity and extending along a longitudinal direction of the sheath while being separated from each other inside the sheath, and two core wires respectively buried in the two conductive members and that detects existence of a foreign object by the two core wires being electrically connected to each other in association with elastic deformation of the sheath due to pressing force from a foreign object, the method comprising:
  a spacer mounting process of, while two exposed conductor portions of lead wires are respectively connected to two core wires drawn out of an end portion of the sheath, inserting a spacer into a space between the two conductive members at the end portion of the sheath; and
  an injection molding process of setting a molding die in such a way as to cover the end portion of the sheath, the two conductor portions, and at least a part of the spacer, and injecting and solidifying a melted molding material into the molding die, wherein
  the spacer includes a first member including an insertion portion configured to be inserted into a space between the two conductive members, and a concave-shaped second member including a first end portion and a second end portion, the first end portion at which a locking portion is provided to be locked to a first end of the first member, the second end portion which is opposed to the locking portion and is connected to a second end of the first member via an integral hinge, and
  the spacer mounting process causes, by, after inserting the insertion portion of the first member into a space between the two conductive members while the locking portion is released, turning the second member about the integral hinge as a fulcrum and thereby locking the locking portion to the first end of the first member, one of the two conductor portions to be contained in a closed cross-section formed between the first member and the second member.

8. The terminal portion molding method of the foreign object detection sensor according to claim 7, wherein
the injection molding process is performed by injecting the molding material melted under a higher injection temperature than a melting point of the spacer.

* * * * *